United States Patent
Yao

(10) Patent No.: US 11,693,457 B2
(45) Date of Patent: Jul. 4, 2023

(54) HINGE

(71) Applicant: FOSITEK CORPORATION, New Taipei (TW)

(72) Inventor: Hsu-Hong Yao, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 17/700,404

(22) Filed: Mar. 21, 2022

(65) Prior Publication Data

US 2023/0161387 A1    May 25, 2023

(30) Foreign Application Priority Data

Nov. 23, 2021 (TW) ................................ 110143538

(51) Int. Cl.
*G06F 1/16* (2006.01)
*F16C 11/04* (2006.01)
*E05D 3/18* (2006.01)
*E05D 3/12* (2006.01)

(52) U.S. Cl.
CPC ............ *G06F 1/1681* (2013.01); *F16C 11/04* (2013.01); *E05D 3/122* (2013.01); *E05D 3/18* (2013.01); *E05Y 2900/606* (2013.01)

(58) Field of Classification Search
CPC ....... G06F 1/1681; E05D 3/022; E05D 3/122; E05D 3/18; F16C 11/04
See application file for complete search history.

(56) References Cited

U.S. PATENT DOCUMENTS

| | | | | |
|---|---|---|---|---|
| 3,394,428 A * | 7/1968 | Peterson | ................ | E05D 7/081 16/354 |
| 7,447,007 B2 * | 11/2008 | Jeun | ..................... | G06F 1/1615 439/31 |
| 8,226,183 B2 * | 7/2012 | Kang | ................... | F25D 23/028 49/246 |
| 8,707,517 B2 * | 4/2014 | Hofer | .................... | E05D 7/0415 16/245 |
| 9,258,914 B2 * | 2/2016 | Koser | ................... | G06F 1/1633 |
| 9,540,855 B2 * | 1/2017 | Kato | ..................... | G06F 1/1618 |
| 10,000,955 B2 * | 6/2018 | Shang | ................... | F16C 11/045 |
| 10,401,914 B2 * | 9/2019 | Shang | ................... | E05D 3/122 |
| 10,890,949 B2 * | 1/2021 | Ou | .......................... | G06F 1/1681 |
| 11,301,006 B2 * | 4/2022 | Hsu | ....................... | G06F 1/1641 |
| 11,353,931 B2 * | 6/2022 | Hsu | ....................... | G06F 1/1681 |
| 11,422,591 B2 * | 8/2022 | Chen | ....................... | E05D 3/122 |
| 11,459,809 B1 * | 10/2022 | Hsu | ....................... | E05D 3/122 |
| 2018/0002957 A1 * | 1/2018 | Ku | .......................... | E05D 3/122 |
| 2022/0261033 A1 * | 8/2022 | Lin | ....................... | G06F 1/1616 |
| 2023/0068228 A1 * | 3/2023 | Sanchez | ................ | G06F 1/1681 |

* cited by examiner

*Primary Examiner* — Jeffrey O'Brien
(74) *Attorney, Agent, or Firm* — Hamre, Schumann, Mueller & Larson, P.C.

(57) ABSTRACT

A hinge includes: a base seat that includes a rack extending in a front-back direction; a moving platform that is movable on the base seat along the front-back direction; and a shaft unit that includes a rotating shaft rotatably extending through the moving platform in a left-right direction, a main gear member rotatably extending through the moving platform, co-movable with the moving platform, and meshed with the rack to constitute a rack and pinion system, and a first bevel gear piece fixedly sleeved on the rotating shaft, and meshed with the main gear member such that rotation of the rotating shaft results in collective linear front-back motion of the shaft unit and the moving platform relative to the base seat.

9 Claims, 12 Drawing Sheets

HINGE

CROSS-REFERENCE TO RELATED APPLICATION

This application claims priority of Taiwanese Patent Application No. 110143538, filed on Nov. 23, 2021.

FIELD

The disclosure relates to a hinge, and more particularly to a hinge for use with a foldable electronic device that enables a sliding motion.

BACKGROUND

In general, a conventional hinge for use in a foldable electronic device, such as a notebook computer, enables pivotal motions about a fixed axis such that two casings of the foldable electronic device are pivotable with respect to each other to convert between an open state and a closed state. However, in terms of usability, the conventional hinge lacks the ability of enabling sliding motions that brings the upper casing (which has the display screen) toward a user for better viewing.

SUMMARY

Therefore, the object of the disclosure is to provide a hinge that enables a sliding motion.

According to the disclosure, a hinge includes a base seat, a moving platform and a shaft unit.

The base seat includes a rack that extends in a front-back direction. The moving platform is movable on the base seat along the front-back direction. The shaft unit includes a rotating shaft, a main gear member and a first bevel gear piece. The rotating shaft rotatably extends through the moving platform in a left-right direction. The main gear member rotatably extends through the moving platform, is co-movable with the moving platform along the front-back direction, and is meshed with the rack to constitute a rack and pinion system. The first bevel gear piece is fixedly sleeved on the rotating shaft and is meshed with the main gear member such that, during rotation of the rotating shaft relative to the moving platform, the first bevel gear piece co-rotates therewith and drives rotation of the main gear member, which is converted into linear motion of the main gear member relative to the rack by virtue of the rack and pinion system, to thereby result in collective linear motion of the shaft unit and the moving platform along the front-back direction relative to the base seat.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
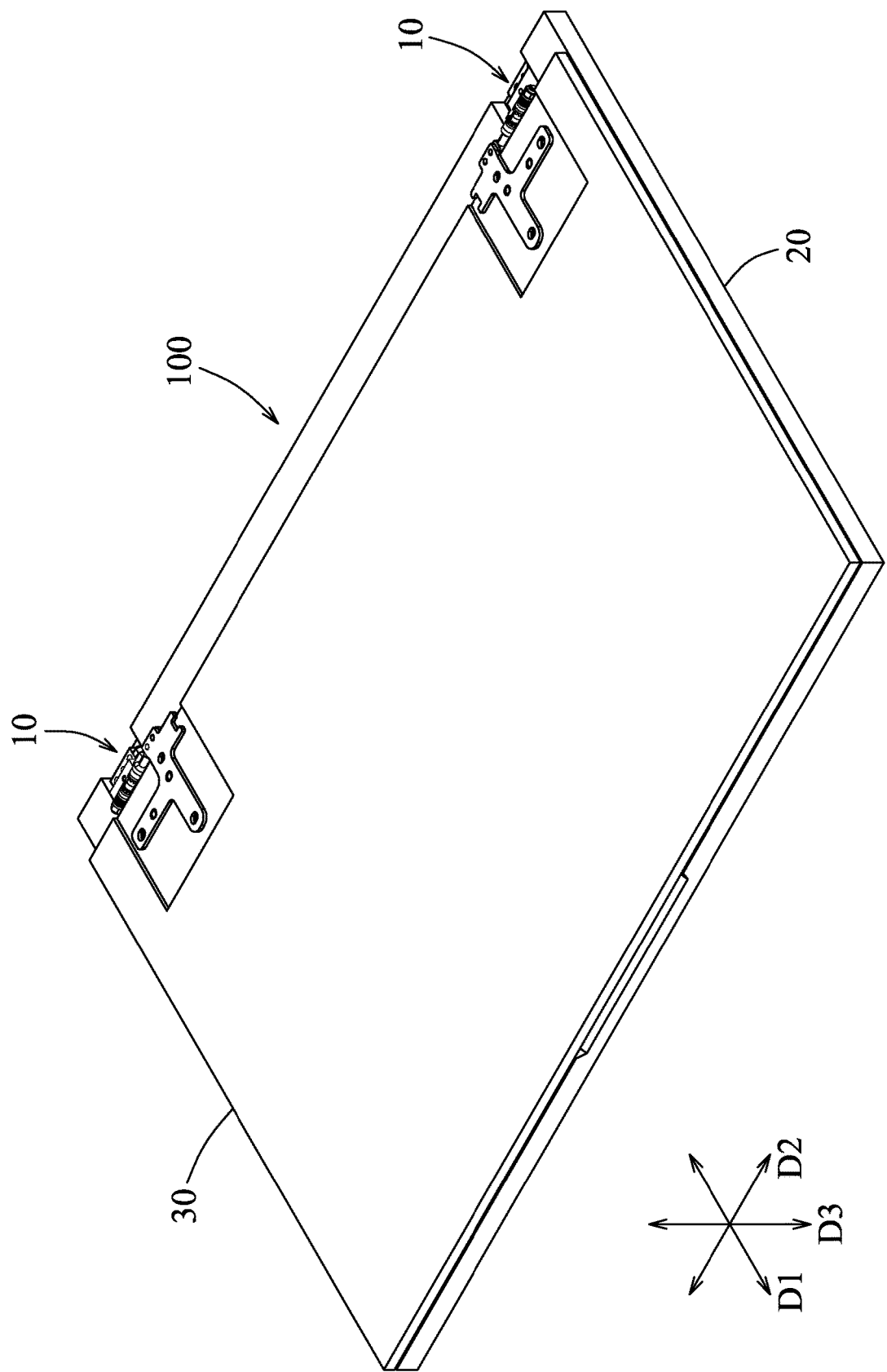
FIG. 1 is a perspective view of a first embodiment of a hinge according to the disclosure being mounted between a first device body and a second device body of an electronic device, illustrating a shaft unit of the first embodiment at a first position.

Before the present disclosure is described in greater detail, it should be noted that where considered appropriate, reference numerals or terminal portions of reference numerals have been repeated among the figures to indicate corresponding or analogous elements, which may optionally have similar characteristics.

Figure 2:
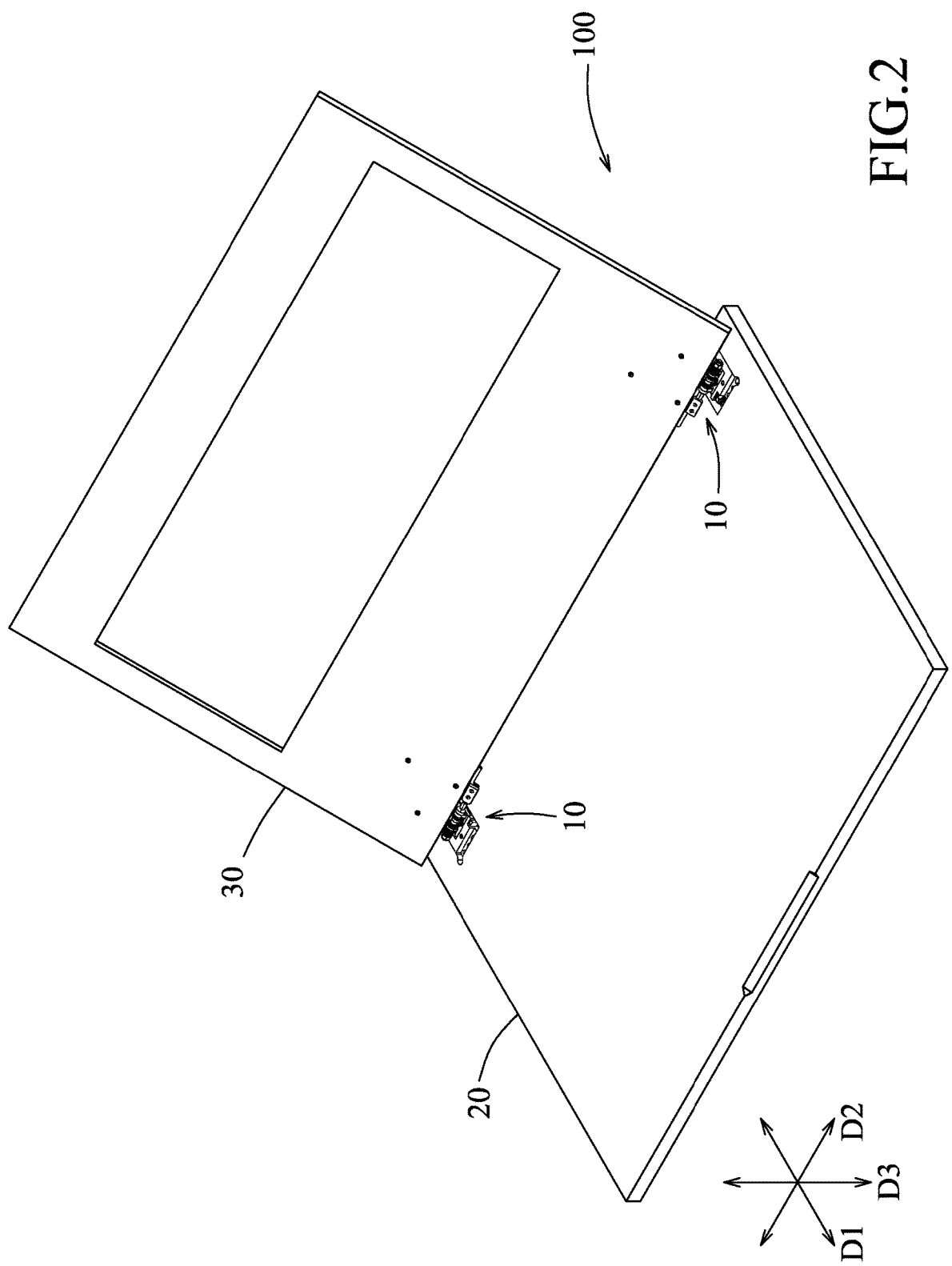
FIG. 2 is a perspective view similar to FIG. 1, illustrating the shaft unit at a second position.
Figure 3:
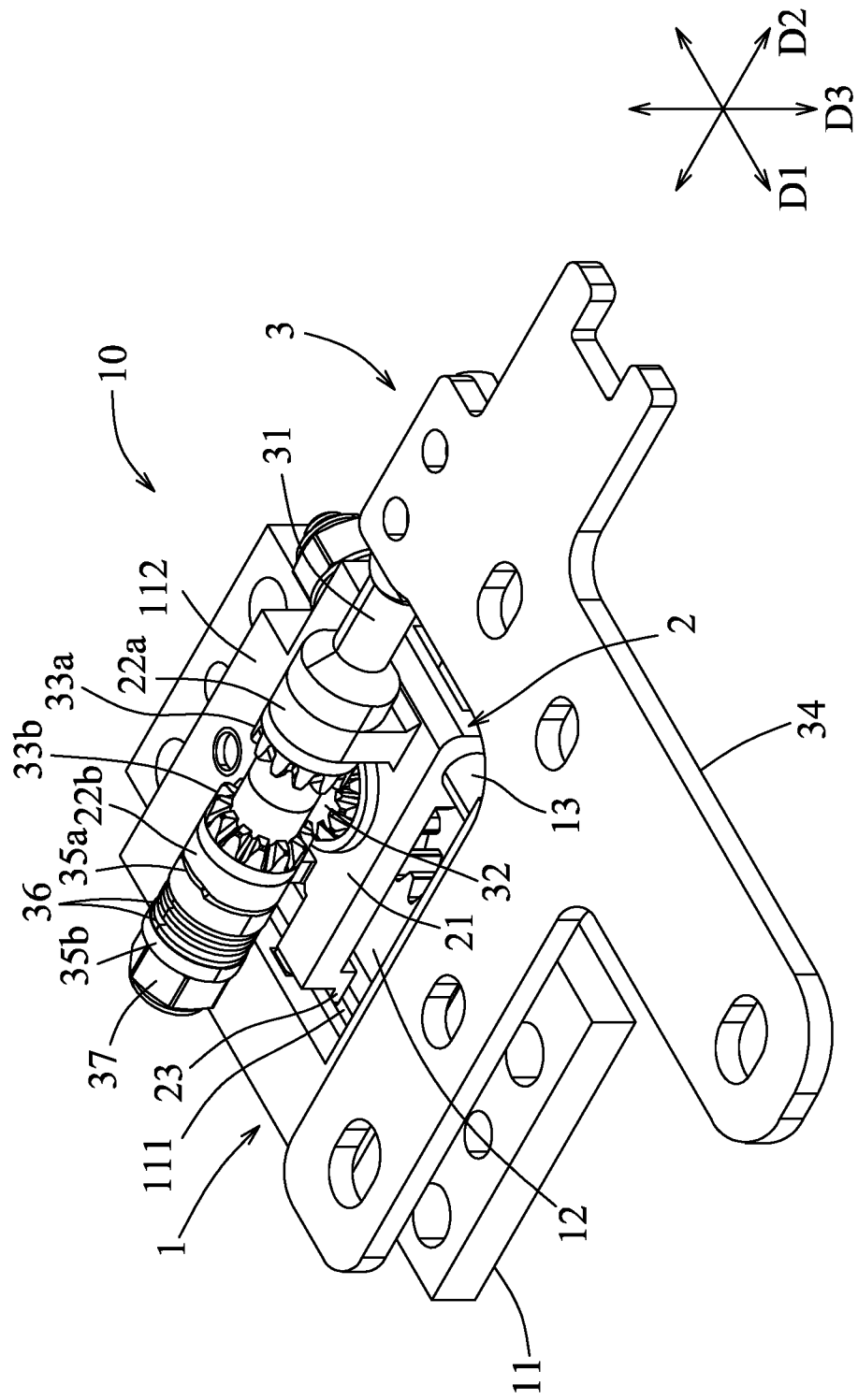
FIG. 3 is a perspective view of the first embodiment, wherein the shaft unit is at the first position.
Figure 4:
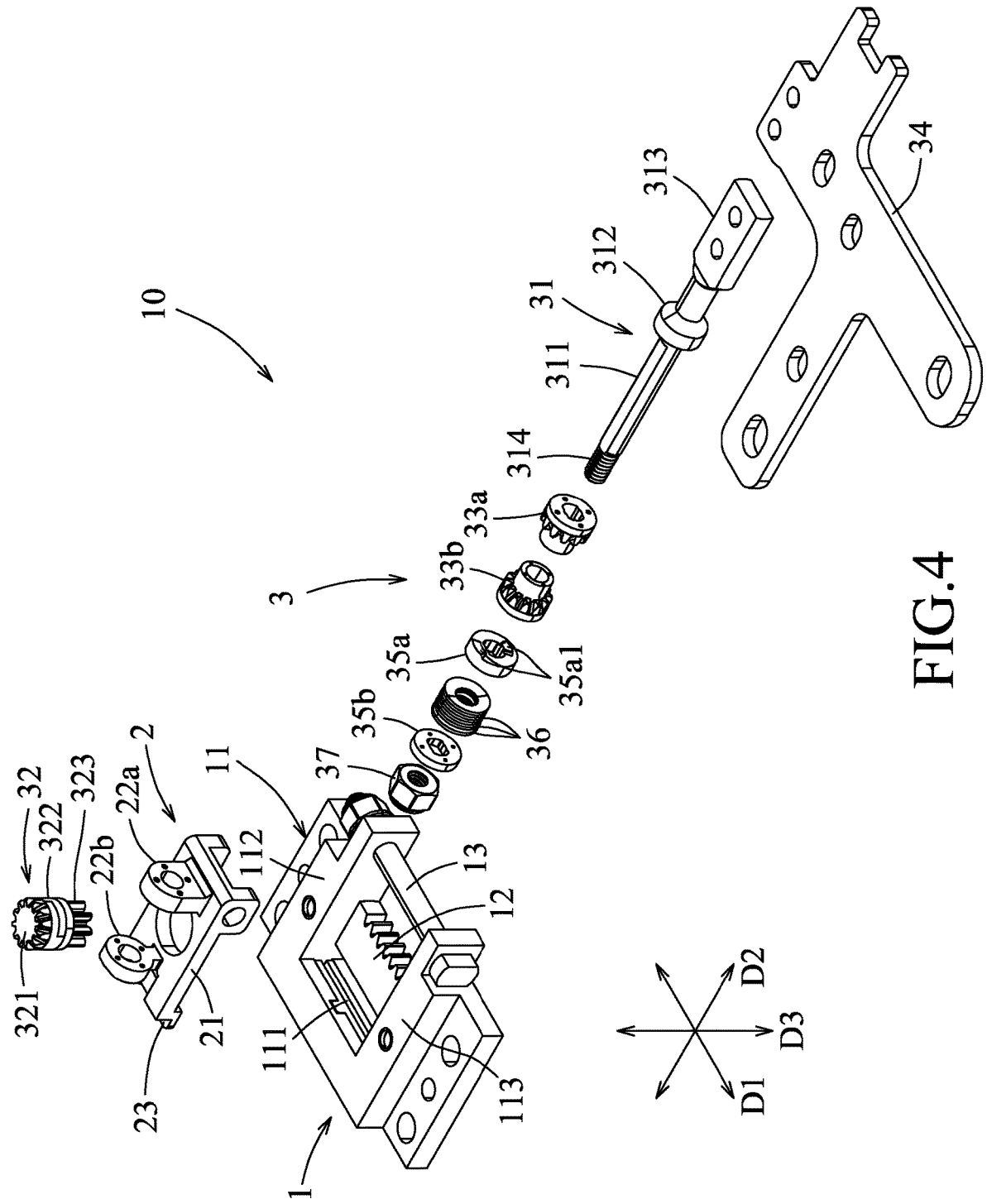
FIG. 4 is an exploded perspective view of the first embodiment.
Figure 5:
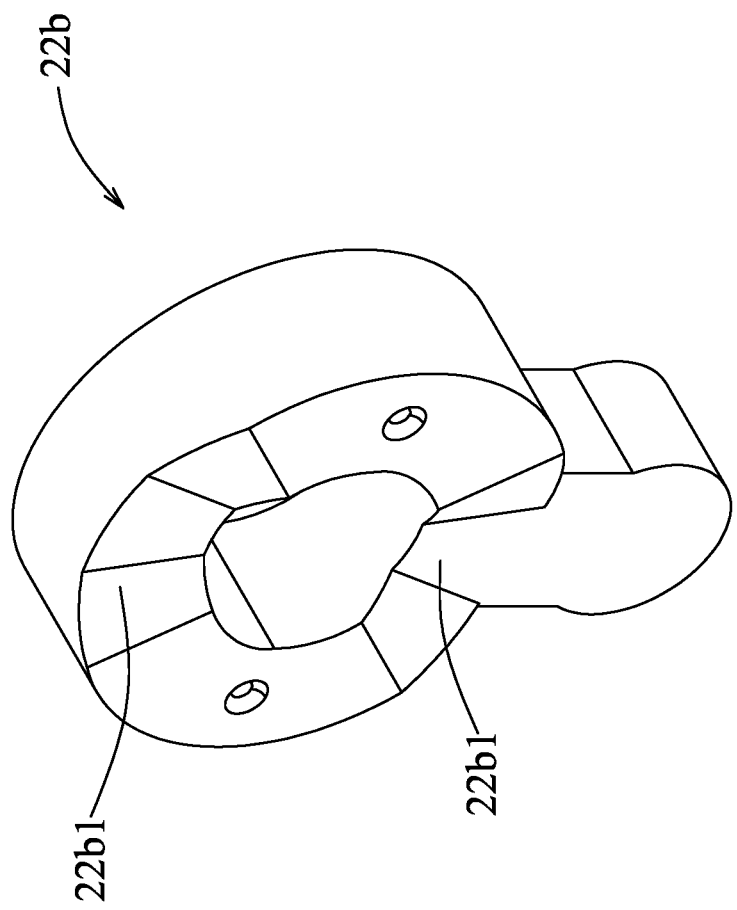
FIG. 5 is a perspective view of a second upright block of a moving platform of the first embodiment.
Figure 6:
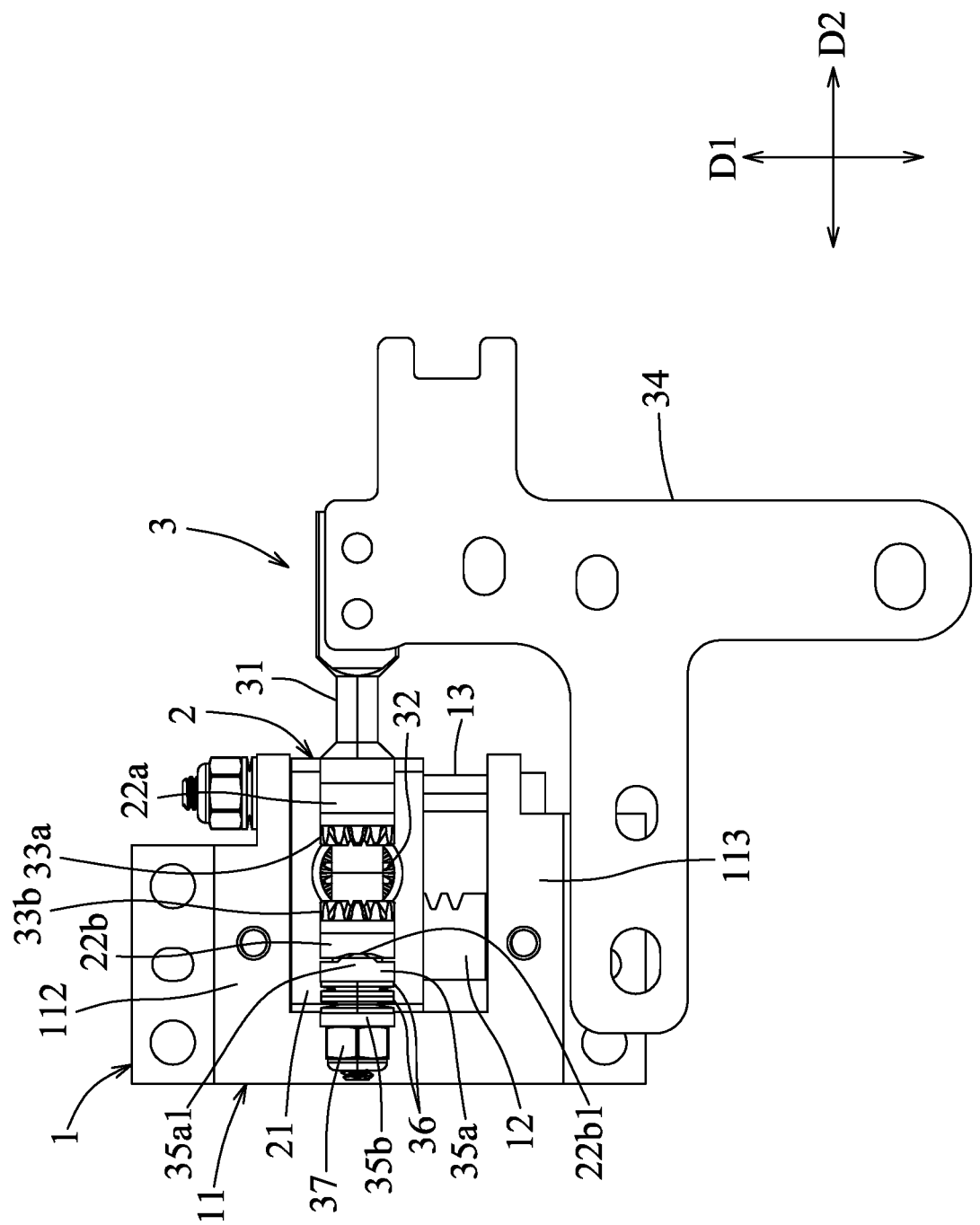
FIG. 6 is a top view of the first embodiment.
Figure 7:
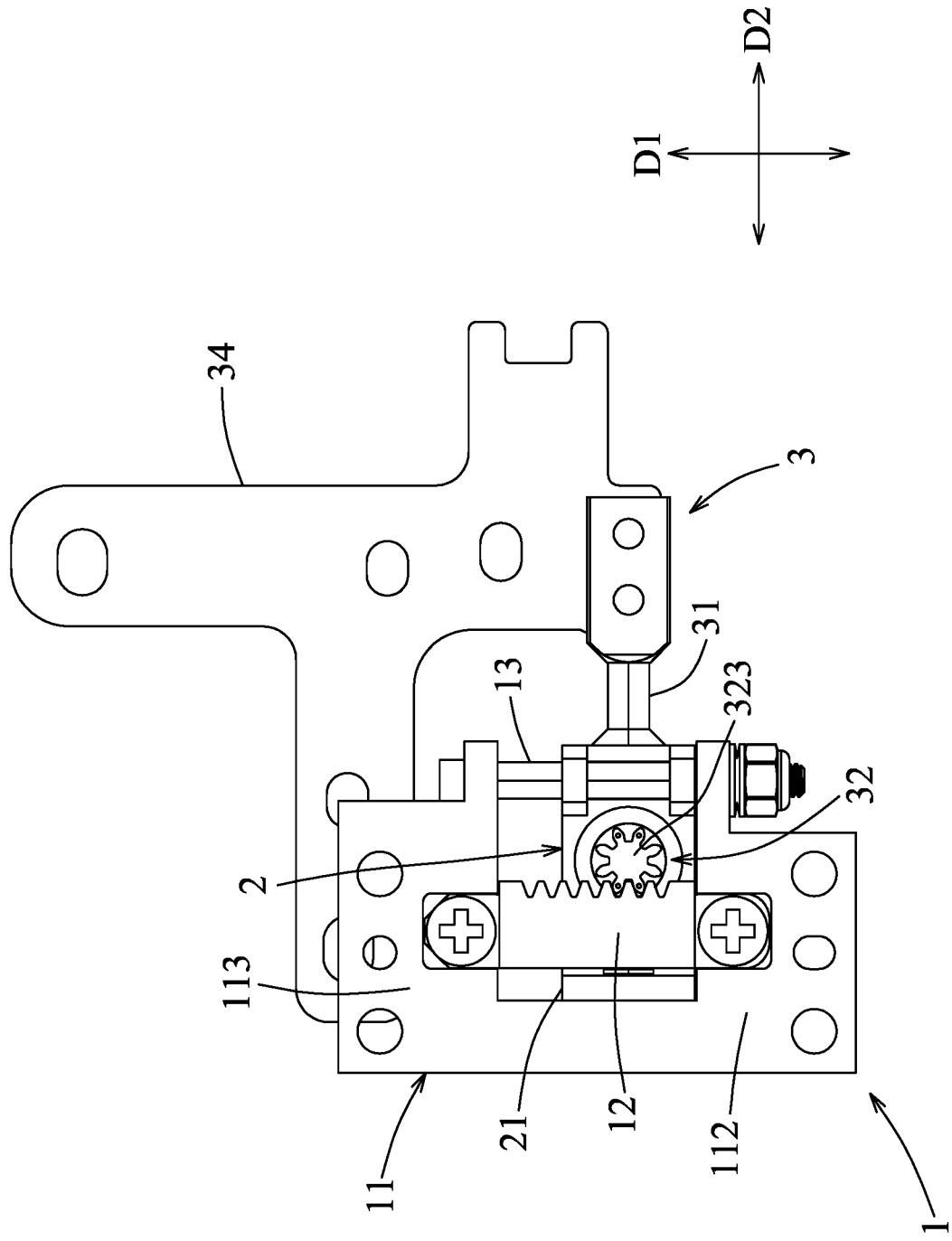
FIG. 7 is a bottom view of the first embodiment.
Figure 8:
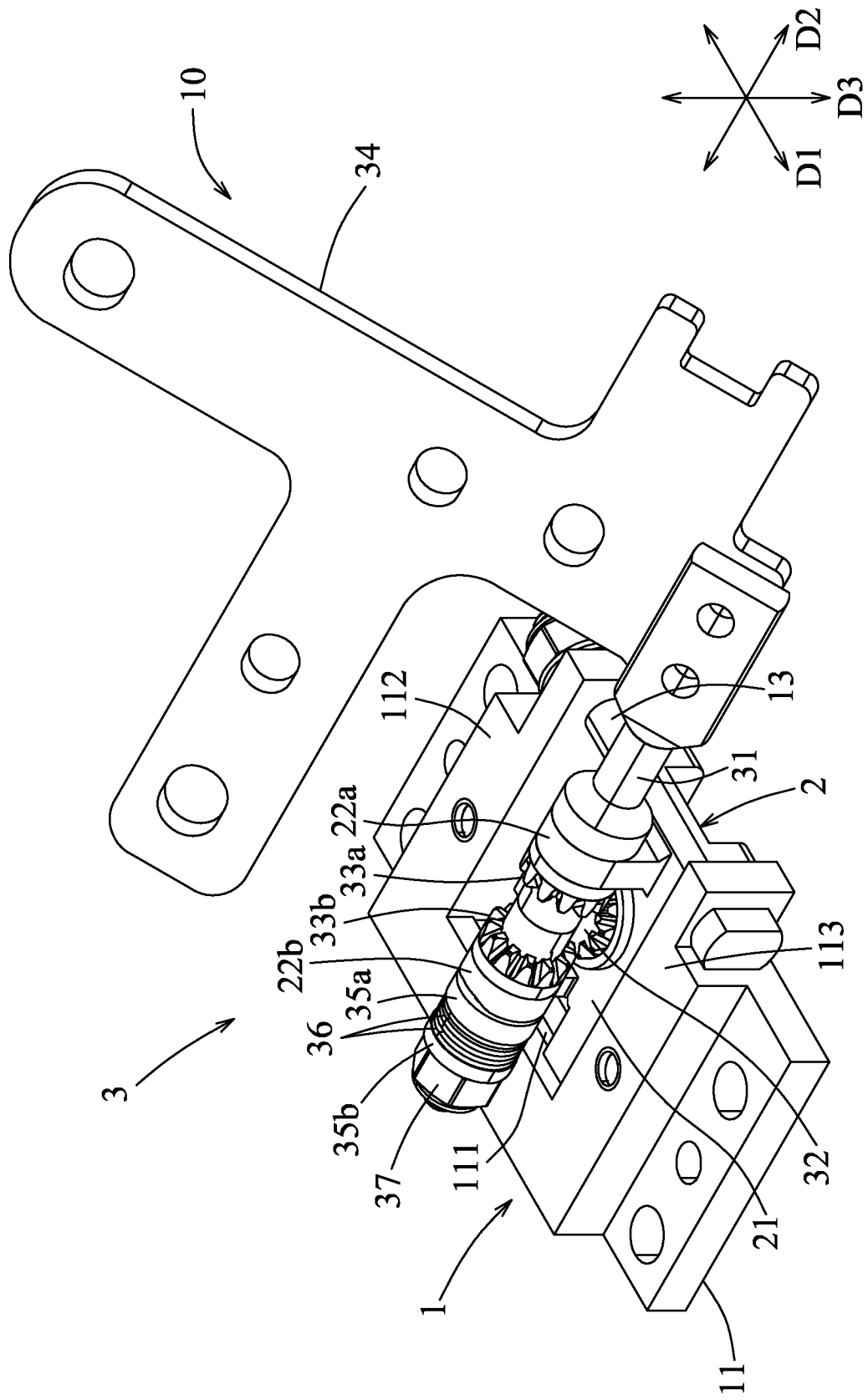
FIG. 8 is a perspective view of the first embodiment, wherein the shaft unit is at the second position.

Referring to FIGS. 1 to 3, a first embodiment of a hinge 10 according to the disclosure is adapted to be mounted between a first device body 20 and a second device body 30 to form an electronic device 100. The electronic device 100 is a foldable device, such as a mobile phone, a tablet, a tablet computer, or a notebook computer. In the present embodiment, the electronic device 100 is a notebook computer, and is mounted with two of the hinges 10 that are symmetrically disposed. The first device body 20 is mounted with a keyboard, and the second device body 30 is mounted with a display screen. The hinge 10 includes a base seat 1, a moving platform 2 and a shaft unit 3.

Referring to FIGS. 3 to 7, the base seat 1 includes a seat body 11, a rack 12 and a guide rod 13. The seat body 11 has first and second side portions 112, 113 that are spaced apart from each other in a front-back direction (D1), and a middle portion 114 that interconnects the first and second side portions 112, 113 such that the middle portion 114 and the first and second side portions 112, 113 substantially form a U-shape. The middle portion 114 of the seat body 11 is formed with a guide groove 111 that extends in the front-back direction (D1).

The rack 12 extends in the front-back direction (D1) and between the first and second side portions 112, 113 of the seat body 11. The guide rod 13 extends in the front-back direction (D1) through the moving platform 2 and the first and second side portions 112, 113 of the seat body 11.

The moving platform 2 is disposed between the first and second side portions 112, 113 of the base seat 1, and is movable on the base seat 1 along the front-back direction (D1). The moving platform 2 includes a bottom plate 21, a first upright block 22a and a second upright block 22b. The bottom plate 21 of the moving platform 2 has one end that is formed with a guide rib 23 extending in the front-back direction (D1) and movably received in the guide groove 111 of the base seat 1, and an opposite end that is provided for the shaft unit 3 to extend therethrough.

The first upright block 22a of the moving platform 2 is disposed fixedly on the bottom plate 21, and is provided for the shaft unit 3 to extend therethrough. The second upright block 22b of the moving platform 2 is disposed fixedly on the bottom plate 21, is spaced apart from the first upright block 22a along a left-right direction (D2), is provided for the shaft unit 3 to extend therethrough, and is formed with two positioning grooves 22b1 at opposite ends thereof. Each of the positioning grooves 22b1 has an inclined section.

The shaft unit 3 includes a rotating shaft 31, a main gear member 32, a first bevel gear piece 33a, a second bevel gear piece 33b, a connecting plate 34, a first gasket 35a, a second gasket 35b, a plurality of spring washers 36 and a fastener 37.

The rotating shaft 31 rotatably extends through the moving platform 2 in the left-right direction (D2). The shaft unit 3 is convertible by rotation of the rotating shaft 31 between a first position, where the shaft unit 3 is proximate to the first side portion 112 of the seat body 11 and the moving platform 2 abuts against the first side portion 112 of the seat body 11, and a second position, where the shaft unit 3 is proximate to the second side portion 113 of the seat body 11 and the moving platform 2 abuts against the second side portion 113 of the seat body 11.

Specifically, the rotating shaft 31 has an extending portion 311 that rotatably extends through the first and second upright blocks 22a, 22b and that is provided for the first bevel gear piece 33a to be sleeved fixedly thereon, an abutment portion 312 that is connected to one of opposite ends of the extending portion 311 and that abuts against the first upright block 22a, a linking portion 313 that is connected to an end of the abutment portion 312 distal from the extending portion 311, and a threaded portion 314 that is connected to the other one of the opposite ends of the extending portion 311.

The main gear member 32 rotatably extends through the moving platform 2 in an up-down direction (D3), is co-movable with the moving platform 2 along the front-back direction (D1), and is meshed with the rack 12 to constitute a rack and pinion system. The main gear member 32, the first bevel gear piece 33a and the second bevel gear piece 33b are all disposed between the first upright block 22a and the second upright block 22b with the first bevel gear piece 33a and second bevel gear piece 33b abutting against the first upright block 22a and the second upright block 22b, respectively.

Specifically, the main gear member 32 has a bevel gear segment 321, a linking segment 322 that is connected to the bevel gear segment 321 and that extends through the moving platform 2, and a pinion segment 323 that is connected to the linking segment 322 and that is meshed with the rack 12. The first bevel gear piece 33a is fixedly sleeved on the rotating shaft 31 and is meshed with the bevel gear segment 321 of the main gear member 32. The second bevel gear piece 33b is movably sleeved on the rotating shaft 31, is meshed with the bevel gear segment 321 of the main gear member 32, and has opposite ends that abut respectively against the second upright block 22b and the bevel gear segment 321 of the main gear member 32 such that the first bevel gear piece 33a is prevented from moving along the left-right direction (D2) relative to the rotating shaft 31.

The connecting plate 34 is fixedly connected to the linking portion 313 of the rotating shaft 31. The connecting plate 34 and the base seat 1 are adapted to be connected to the second device body 30 and the first device body 20, respectively. The first gasket 35a and the second gasket 35b are co-rotatably sleeved on the extending portion 311 of the rotating shaft 31 and are spaced apart from each other. The first gasket 35a is formed with two positioning protrusions 35a1 that are opposite to each other, and that are configured to be movably received in the positioning grooves 22b1 of the second upright block 22b, respectively. It should be noted that, in variations of the embodiment, the positioning grooves 22b1 of the second upright block 22b and the positioning protrusions 35a1 of the first gasket 35a are not limited to the present configuration and may change positions with each other (i.e., the second upright block 22b may be formed with the positioning protrusions 35a1 and the first gasket 35a may be formed with the positioning grooves 22b1).

The spring washers 36 are sleeved on the extending portion 311 of the rotating shaft 31, and are disposed between the first gasket 35a and the second gasket 35b. Specifically, the spring washers 36 abut against one another, and an assembly of the spring washers 36 has opposite ends abutting respectively against the first gasket 35a and the second gasket 35b, exerting a spring force therebetween. The fastener 37 is a nut that is threadedly engaged with the threaded portion 314 of the rotating shaft 31, and that abuts against the second gasket 35b to ensure abutments among the first gasket 35a, the second gasket 35b and the spring washers 36 and to prevent the first gasket 35a, the second gasket 35b and the spring washers 36 from moving in the left-right direction (D2) along the extending portion 311 of the rotating shaft 31.

Referring to FIG. 3 and FIGS. 8 to 10, when a user intends to use the electronic device 100 and unfolds the first and second device bodies 20, 30, the rotating shaft 31 is driven by the connecting plate 34 to rotate relative to the base seat 1 and the moving platform 2, thereby converting the shaft unit 3 from the first position to the second position (i.e., when the first and second device bodies 20, 30 are folded, the shaft unit 3 is at the first position; when the first and second device bodies 20, 30 are unfolded, the shaft unit 3 is at the second position).

Specifically, during rotation of the rotating shaft 31, the first bevel gear piece 33a co-rotates the rotating shaft 31 and drives rotation of the main gear member 32, which is converted into linear motion of the main gear member 32 relative to the rack 12 by virtue of the rack and pinion system, to thereby result in collective linear motion of the shaft unit 3 and the moving platform 2 along the front-back direction (D1) relative to the base seat 1. In addition, the rotation of the main gear member 32 also drives the second bevel gear piece 33b to rotate for stabling the rotation of the rotating shaft 31.

Figure 9:
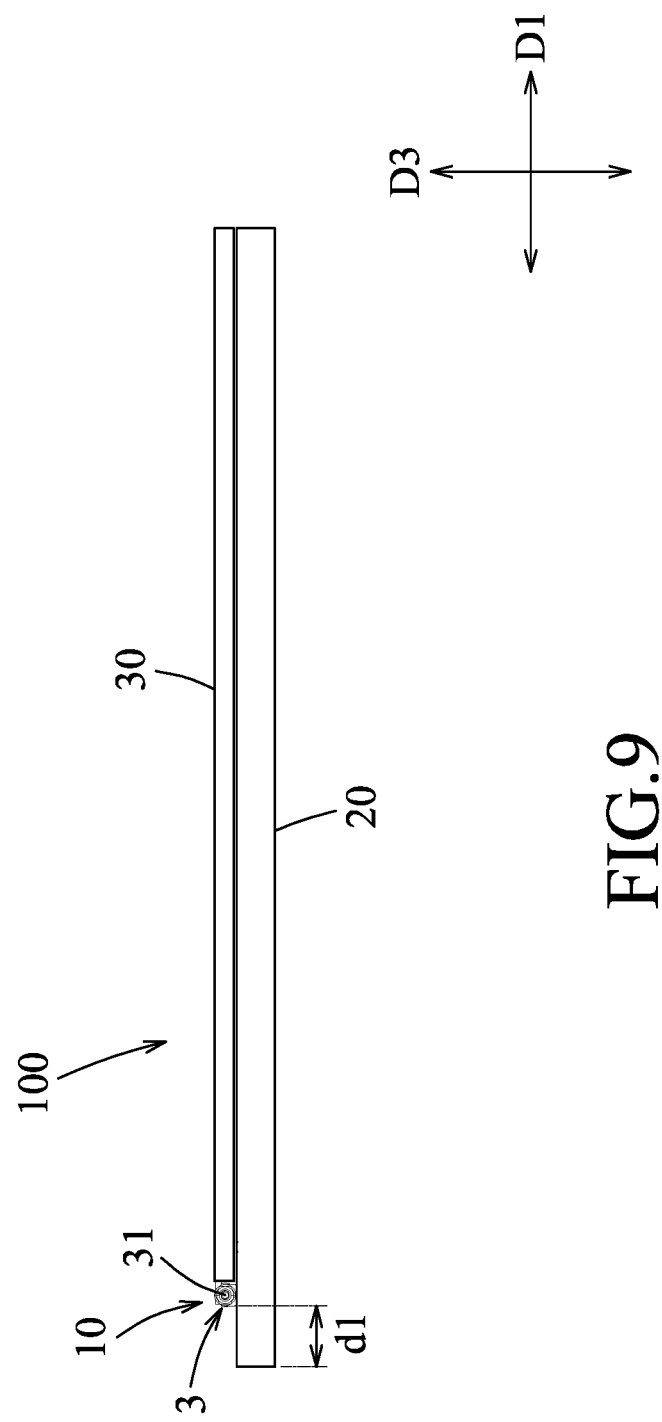
FIG. 9 is a side view of the first embodiment mounted in the electronic device, wherein the shaft unit is at the first position.
Figure 10:
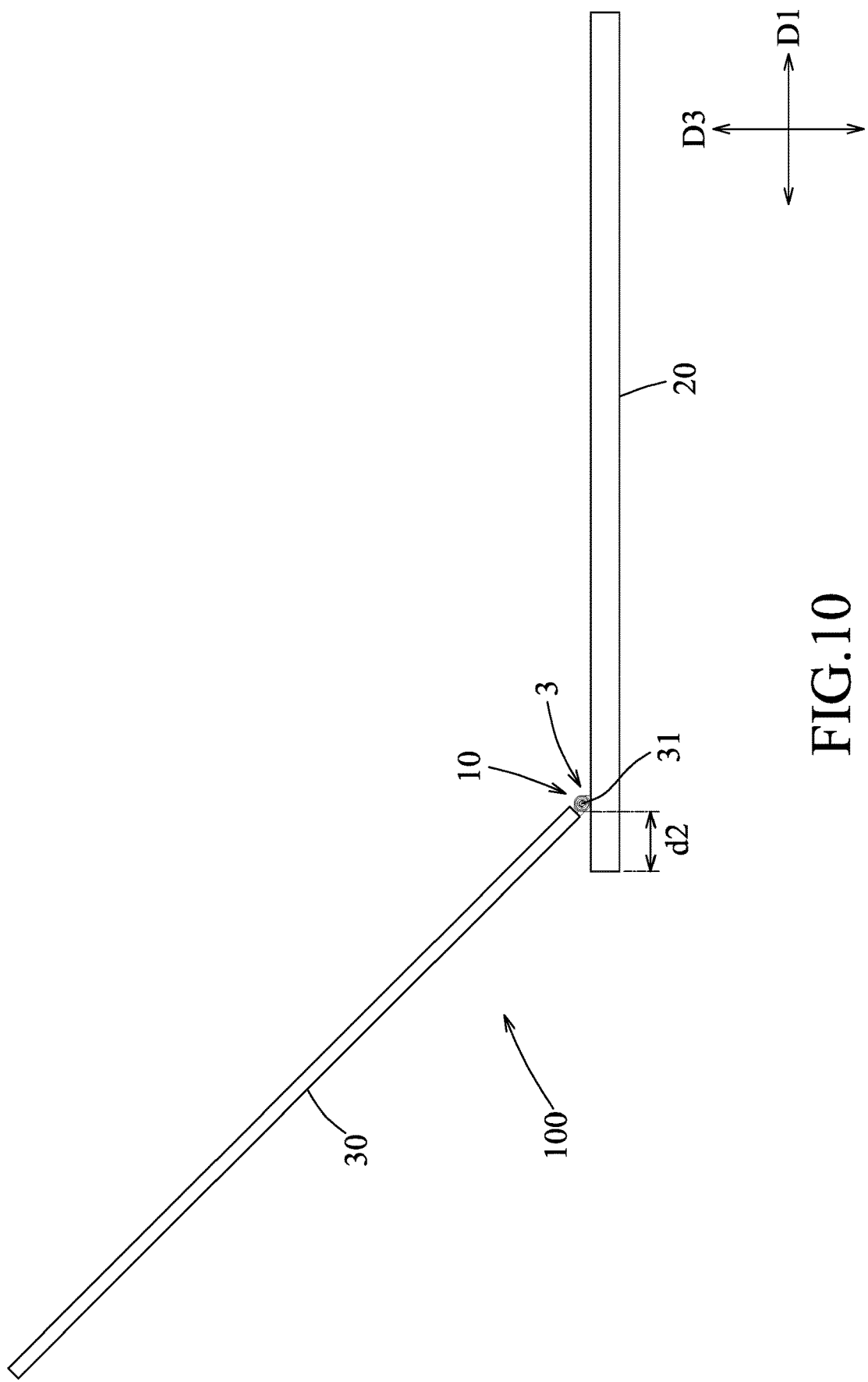
FIG. 10 is a side view similar to FIG. 9, wherein the shaft unit is at the second position.

It should be noted that, as shown in FIGS. 9 and 10, when the shaft unit 3 is at the first position (or the first and second device bodies 20, 30 are folded), a first distance (d1) is measured between the shaft unit 3 and a rear end of the first device body 20 (see FIG. 9), and the positioning protrusions 35a1 of the first gasket 35a are received in the positioning grooves 22b1 of the second upright block 22b, respectively. By virtue of the spring force of the spring washers 36, engagement of the positioning protrusions 35a1 and the positioning grooves 22b1 provides a positioning effect, which prevents the first and second device bodies 20, 30 from being accidentally unfolded, unless a certain amount of external force is applied.

When the shaft unit 3 is at the second position (or the first and second device bodies 20, 30 are unfolded), a second distance (d2) greater than the first distance (d1) is measured between the shaft unit 3 and the rear end of the first device body 20 (see FIG. 10), and the positioning protrusions 35a1 are not received in the positioning grooves 22b1.

It should also be noted that, when the shaft unit 3 is converted from the second position back to the first position, by virtue of the above-mentioned inclined section of the positioning grooves 22b1, the positioning protrusions 35a1 are guided by the inclined section to slide smoothly into the positioning grooves 22b1. Furthermore, by virtue of the above-mentioned spring force of the spring washers 36, after an initial exertion of an external force that starts the movement of the positioning protrusions 35a1 toward the positioning grooves 22b1, the positioning protrusions 35a1 are able to continue moving into the positioning grooves 22b1 even when the external force is no longer exerted. As such, the first and second device bodies 20, 30, are able to gradually and automatically move toward each other until folded.

Figure 11:
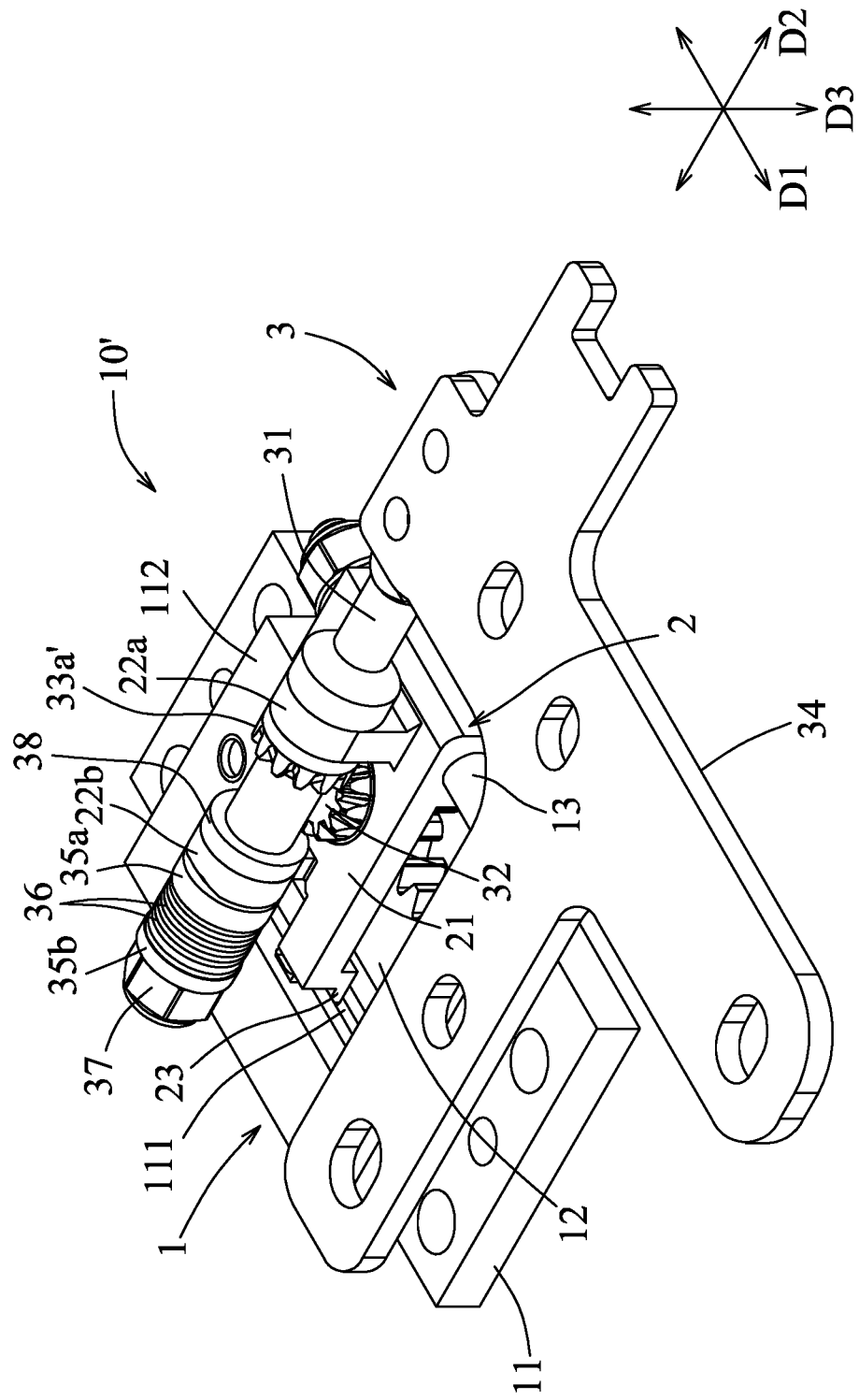
FIG. 11 is a perspective view of a second embodiment of the hinge according to the disclosure.
Figure 12:
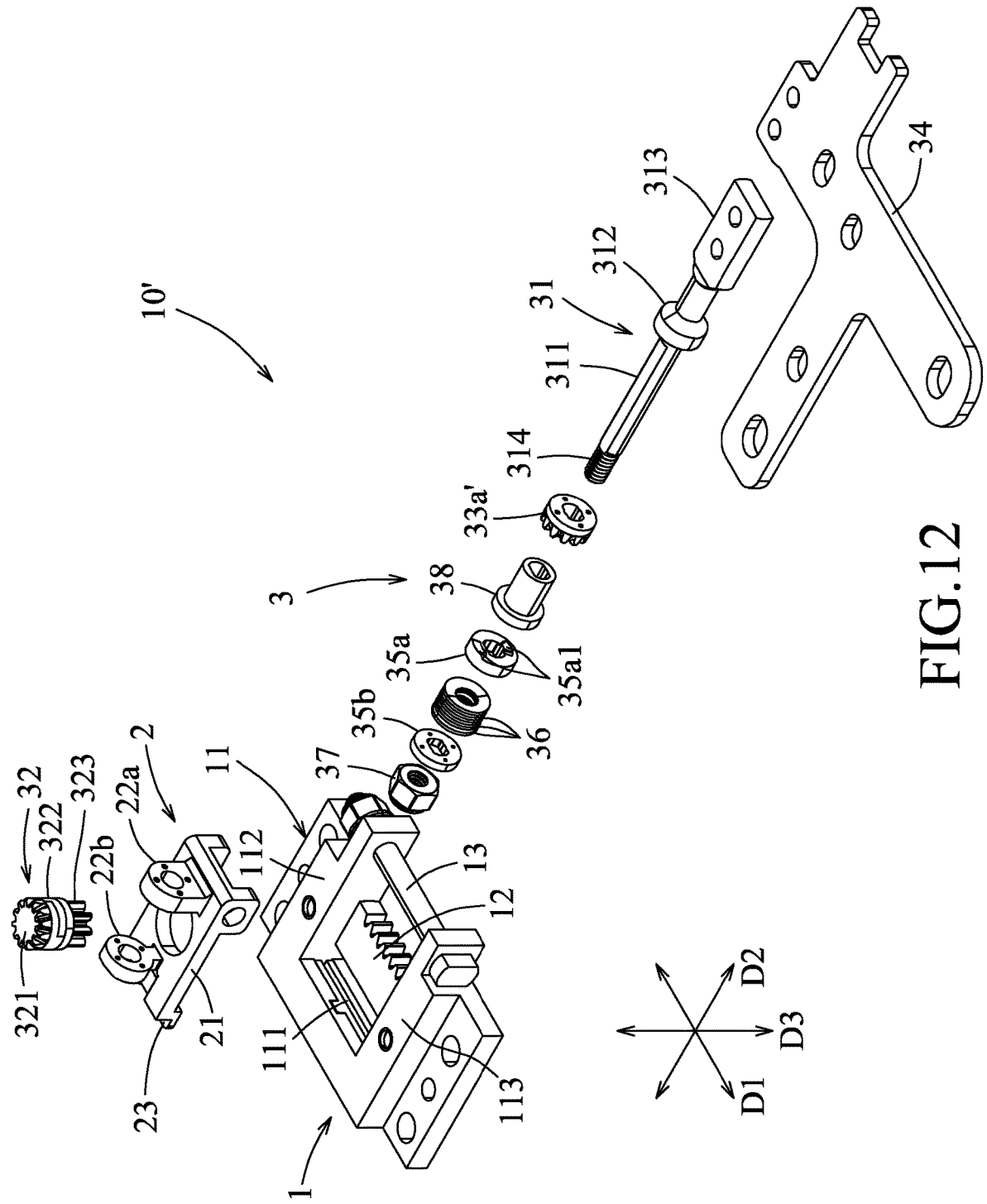
FIG. 12 is an exploded perspective view of the second embodiment.

Referring to FIGS. 11 and 12, a second embodiment of the hinge 10' according to the disclosure is similar to the first embodiment, and the difference between the two is described as follows.

In the second embodiment, the shaft unit 3 further includes a sleeve piece 38 that is movably sleeved on the rotating shaft 31 to replace the second bevel gear piece 33b of the first embodiment, and the configuration of the first bevel gear piece 33a' is slightly different from that of the first embodiment. The sleeve piece 38 has opposite ends that abut respectively against the second upright block 22b and the first bevel gear piece 33a' such that the first bevel gear piece 33a' is prevented from moving along the left-right direction (D2) relative to the rotating shaft 31. By virtue of the sleeve piece 38, less energy is wasted (on driving the rotation of the second bevel gear piece 33b'), and a feeling of gear idling that the user might feel involving the rotation of the second bevel gear piece 33b' is reduced.

In sum, by virtue of the configurations and meshing engagements among the rack 12, the main gear member 32, and the first bevel gear piece 33a, the embodiments of the hinge 10 according to the disclosure enable a sliding motion that brings the first device body 20 of the electronic device 100 toward the user when the electronic device 100 is unfolded, providing better viewing experiences.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A hinge comprising:
   a base seat including a rack that extends in a front-back direction;
   a moving platform movable on said base seat along the front-back direction; and
   a shaft unit including
   a rotating shaft that rotatably extends through said moving platform in a left-right direction,
   a main gear member that rotatably extends through said moving platform, that is co-movable with said moving platform along the front-back direction, and that is meshed with said rack to constitute a rack and pinion system, and
   a first bevel gear piece that is fixedly sleeved on said rotating shaft and that is meshed with said main gear member such that, during rotation of said rotating shaft relative to said moving platform, said first bevel gear piece co-rotates therewith and drives rotation of said main gear member, which is converted into linear motion of said main gear member relative to said rack by virtue of said rack and pinion system, to thereby result in collective linear motion of said shaft unit and said moving platform along the front-back direction relative to said base seat;
   wherein said base seat further includes:
   a seat body that has first and second side portions that are spaced apart from each other in the front-back direction, and a middle portion that interconnects said first and second side portions such that said middle portion and said first and second side portions substantially form a U-shape, said moving platform being disposed between said first and second side portions; and
   a guide rod that extends in the front-back direction through said moving platform and said first and second side portions of said seat body, said middle portion of said seat body being formed with a guide groove that extends in the front-back direction, said moving platform being formed with a guide rib that extends in the front-back direction and that is movably received in said guide groove.

2. The hinge as claimed in claim 1, wherein said main gear member has a bevel gear segment that is meshed with said first bevel gear piece, a linking segment that is connected to said bevel gear segment and that extends through said moving platform, and a pinion segment that is connected to said linking segment and that is meshed with said rack.

3. The hinge as claimed in claim 1, wherein said moving platform includes a bottom plate, a first upright block that is disposed fixedly on said bottom plate and that is provided for said rotating shaft to extend rotatably therethrough, and a second upright block that is disposed fixedly on said bottom plate, that is provided for said rotating shaft to extend rotatably therethrough and that is spaced apart from said first upright block along the left-right direction, said main gear member and said first bevel gear piece being disposed between said first upright block and said second upright block with said first bevel gear piece abutting against said first upright block.

4. The hinge as claimed in claim 3, wherein said hinge is adapted to be mounted between a first device body and a second device body, said rotating shaft having an extending portion that extends through said first upright block and said second upright block and that is provided for said first bevel gear piece to be sleeved fixedly thereon, an abutment portion that is connected to one of opposite ends of said extending portion and that abuts against said first upright block, and a linking portion that is connected to an end of said abutment portion distal from said extending portion, said shaft unit further including a connecting plate that is fixedly connected to said linking portion of said rotating shaft, said connecting plate and said base seat being adapted to be connected to said second device body and said first device body, respectively.

5. The hinge as claimed in claim 4, wherein said rotating shaft further has a threaded portion that is connected to the other one of said opposite ends of said extending portion, said shaft unit further including a first gasket that is co-rotatably sleeved on said extending portion of said rotating shaft, a second gasket that is co-rotatably sleeved on said extending portion of said rotating shaft and that is spaced apart from said first gasket, a plurality of spring washers that are sleeved on said extending portion of said rotating shaft and that are disposed between said first gasket and said second gasket, and a fastener that is threadedly engaged with said threaded portion and that abuts against said second gasket, said spring washers abutting against one another, an assembly of said spring washers having opposite ends abutting respectively against said first gasket and said second gasket.

6. The hinge as claimed in claim 5, wherein said shaft unit is convertible by rotation of said rotating shaft between a first position, where said shaft unit is proximate to said first side portion of said seat body and said moving platform abuts against said first side portion of said seat body, and a second position, where said shaft unit is proximate to said second side portion of said seat body and said moving platform abuts against said second side portion of said seat body.

7. The hinge as claimed in claim 6, wherein one of said second upright block and said first gasket is formed with at least one positioning protrusion, and the other one of said second upright block and said first gasket is formed with at least one positioning groove, said at least one positioning protrusion being received in said at least one positioning groove when said shaft unit is at the first position.

8. The hinge as claimed in claim 3, wherein said shaft unit further includes a second bevel gear piece that is movably sleeved on said rotating shaft and that is meshed with said main gear member, said second bevel gear piece having opposite ends that abut respectively against said second upright block and said main gear member such that said first bevel gear piece is prevented from moving along the left-right direction relative to said rotating shaft.

9. The hinge as claimed in claim 3, wherein said shaft unit further includes a sleeve piece that is movably sleeved on said rotating shaft, said sleeve piece having opposite ends that abut respectively against said second upright block and said first bevel gear piece such that said first bevel gear piece is prevented from moving along the left-right direction relative to said rotating shaft.

* * * * *